United States Patent
Syed et al.

(10) Patent No.: US 7,786,932 B2
(45) Date of Patent: Aug. 31, 2010

(54) TIME-TO-FIRST-FIX FOR POSITION DETERMINATION

(75) Inventors: Qutub Salman Syed, Gilbert, AZ (US); Xiang Yuan, Chandler, AZ (US); James Stephen, Phoenix, AZ (US)

(73) Assignee: SiRF Technology, Inc., San Jose, CA (US)

( * ) Notice: Subject to any disclaimer, the term of this patent is extended or adjusted under 35 U.S.C. 154(b) by 110 days.

(21) Appl. No.: 11/689,960

(22) Filed: Mar. 22, 2007

(65) Prior Publication Data

US 2008/0231508 A1    Sep. 25, 2008

(51) Int. Cl.
*G01S 19/24* (2010.01)
*G01S 19/37* (2010.01)

(52) U.S. Cl. .............................. 342/357.12; 342/357.15

(58) Field of Classification Search ............ 342/357.12, 342/357.15
See application file for complete search history.

(56) References Cited

U.S. PATENT DOCUMENTS

| | | | |
|---|---|---|---|
| 6,618,006 B1 * | 9/2003 | Syrjarinne | 342/357.12 |
| 6,768,451 B2 * | 7/2004 | Akopian et al. | 342/357.12 |
| 6,771,215 B2 * | 8/2004 | Akopian et al. | 342/357.12 |
| 6,944,540 B2 * | 9/2005 | King et al. | 701/213 |
| 2005/0174284 A1 * | 8/2005 | Abraham et al. | 342/357.09 |

* cited by examiner

*Primary Examiner*—Gregory C Issing
(74) *Attorney, Agent, or Firm*—Haynes & Boone, LLP.

(57) ABSTRACT

An improved time-to-first-fix (TTFF) for GPS systems is provided through a comparison of the time-of-week (TOW) to the sub-frame identification (ID). In one embodiment, this comparison comprises dividing the TOW to form a ratio and performing a modulus operation on the ratio to form a remainder, which is then incremented. If the incremented remainder equals the sub-frame ID, the TOW is assumed to be valid, thereby providing a time of transmission. The time of transmission may then be used to calculate pseudoranges and determine a receiver's location.

19 Claims, 2 Drawing Sheets

TIME-TO-FIRST-FIX FOR POSITION DETERMINATION

FIELD OF INVENTION

The disclosure relates to satellite-based positioning systems and methods. More particularly, the disclosure relates to an improved time-to-first-fix (TTFF) for a satellite-based position determination.

BACKGROUND

Satellite-based positioning systems include constellations of earth orbiting satellites that continually transmit orbit information and ranging signals to receivers. An example of a satellite-based positioning system is the Global Positioning System (GPS), which includes a constellation of earth-orbiting satellites, also referred to as GPS satellites, satellite vehicles, or space vehicles (SVs). The GPS satellites circle the earth twice a day in a very precise orbit and transmit signal information to the earth. The satellite signal information is received by GPS receivers which can be in portable or mobile units, or in fixed positions on base stations and/or servers.

A GPS receiver uses the satellite signal information to calculate the receiver's precise location. Generally the GPS receiver compares the time GPS signals or satellite signals were transmitted by a satellite with the time of receipt of that signal at the receiver. This time difference between satellite signal reception and transmission provides the receiver with information as to the range of the receiver from the transmitting satellite. Using pseudo-range measurements (pseudo because the range information is offset by an amount proportional to the offset between the GPS satellite clock and the receiver clock) from a number of additional satellites, the receiver can determine its position. The GPS receiver uses received signals from at least four satellites to calculate three-dimensional position (latitude, longitude, and altitude), or at least three satellites to calculate two-dimensional position (if altitude is known).

Each satellite transmits a unique pseudorandom code that is known by the GPS receiver. The GPS receiver correlates received satellite signals with the known pseudorandom codes to determine a signal reception time. The pseudorandom codes are transmitted continuously by the satellites approximately every thousand nanoseconds. If the satellites transmitted only these codes (denoted as the C/A codes), all a GPS receiver could determine was the time a given code was received. The GPS receiver would not know when the code was transmitted. The time of transmission by the satellite is necessary for the GPS receiver to determine the pseudorange between it and the transmitting satellite (through multiplication of the time difference between transmission and reception by the speed of light). But even the pseudorange is not enough information—the GPS receiver must also know where the transmitting satellite is located. To provide this information, the pseudorandom codes are modulated to include satellite ephemeris and almanac data. The almanac data tells the GPS receiver where each GPS satellite of the constellation should be at any time over a wide time interval that spans a few days or weeks. The broadcast ephemeris data, which is continuously transmitted by each satellite, contains important information about satellite position, velocity, clock bias, and clock drift. In particular, the broadcast ephemeris data for a GPS satellite predicts the satellite's state over a future interval of approximately four hours by describing a Keplerian element ellipse with additional corrections that then allow the satellite's position to be calculated in an earth-centered, earth-fixed (ECEF) set of rectangular coordinates at any time during the period of validity of the broadcast ephemeris data.

The broadcast ephemeris data is modulated onto the codes continuously transmitted by the GPS satellites at a rate of 50 bits per second. These bits are organized into 30-bit long words such that each word takes 0.6 second to transmit given the 50 bits per second data rate. In turn, the words are organized into sub-frames of 10 words each. It follows that each sub-frame is six seconds in length. Each sub-frame begins with a telemetry (TLM) word followed by a handover word (HOW). The HOW includes the time of week (TOW) that allows a GPS receiver to calculate the transmitted time for a given code. The TOW resets every week such that the initial sub-frame at the start of a week has a TOW of 0.0 seconds, the subsequent sub-frame has a TOW of six seconds, and so on. To calculate a pseudorange measurement, a GPS receiver must know the position of a given received code sequence within the bit/word/sub-frame organization. This knowledge is referred to as a time-to-first fix (TTFF).

A GPS receiver may recognize where a given received code sequence fits within a sub-frame because each TLM word at the start of the sub-frame begins with a unique 8-bit preamble. Thus, when a GPS receiver receives the 8-bit preamble, it can then calculate the subsequent position of a particular received code sequence. Given that the GPS receiver knows the time of reception, it may then calculate the pseudorange using the preamble-and-TOW-derived time of transmission. But noise can corrupt the bits such that a GPS receiver believes it has received the preamble due to noise when in reality the preamble was not transmitted. To protect against such a false reception, conventional GPS receivers wait another six seconds to see if the preamble is again transmitted. Although the detection of the second preamble could also be due to noise, the probability of such an occurrence is quite remote such that a TTFF may be presumed once the second preamble has been observed. Although a six second TTFF may seem rather insignificant, the length of the TTFF becomes quite important in applications such as 911 emergency calls. Lives may be saved should a GPS receiver offer a TTFF faster than six seconds.

Accordingly, there is a need in the art for GPS receivers offering improved time-to-first-fix (TTFF) times.

SUMMARY

In accordance with an aspect of the invention, a method is provided that includes: receiving GPS-encoded signals from a satellite, wherein the GPS-encoded signals are organized into sub-frames; for a given received sub-frame, identifying the time of week (TOW) and the sub-frame identification (ID); and comparing the sub-frame ID to the TOW to determine a time of transmission for the given received sub-frame.

In accordance with another aspect of the invention, a receiver is provided that includes: a GPS signal processor adapted to decode GPS-encoded signals to provide decoded signals; and a processor adapted to identify sub-frames in the decoded signals, the processor being further adapted to identify, for a given identified sub-frame, a time-of-week (TOW) message and a sub-frame identification (ID), the processor being further adapted to compare the sub-frame to the TOW to determine a time of transmission.

In accordance with another aspect of the invention, an apparatus is provided that includes: means for decoding GPS-encoded signals so as to retrieve a time-of-week (TOW) message and a sub-frame ID for a given transmitted sub-frame from a GPS satellite; and means for comparing the sub-frame ID to the TOW to determine a time of transmission for the given transmitted sub-frame.

BRIEF DESCRIPTION OF THE DRAWINGS

These figures are provided to assist in describing embodiments of the invention, and are not intended to be exclusive or limiting. In the figures, like reference numerals designate like elements.

DETAILED DESCRIPTION

Figure 1:
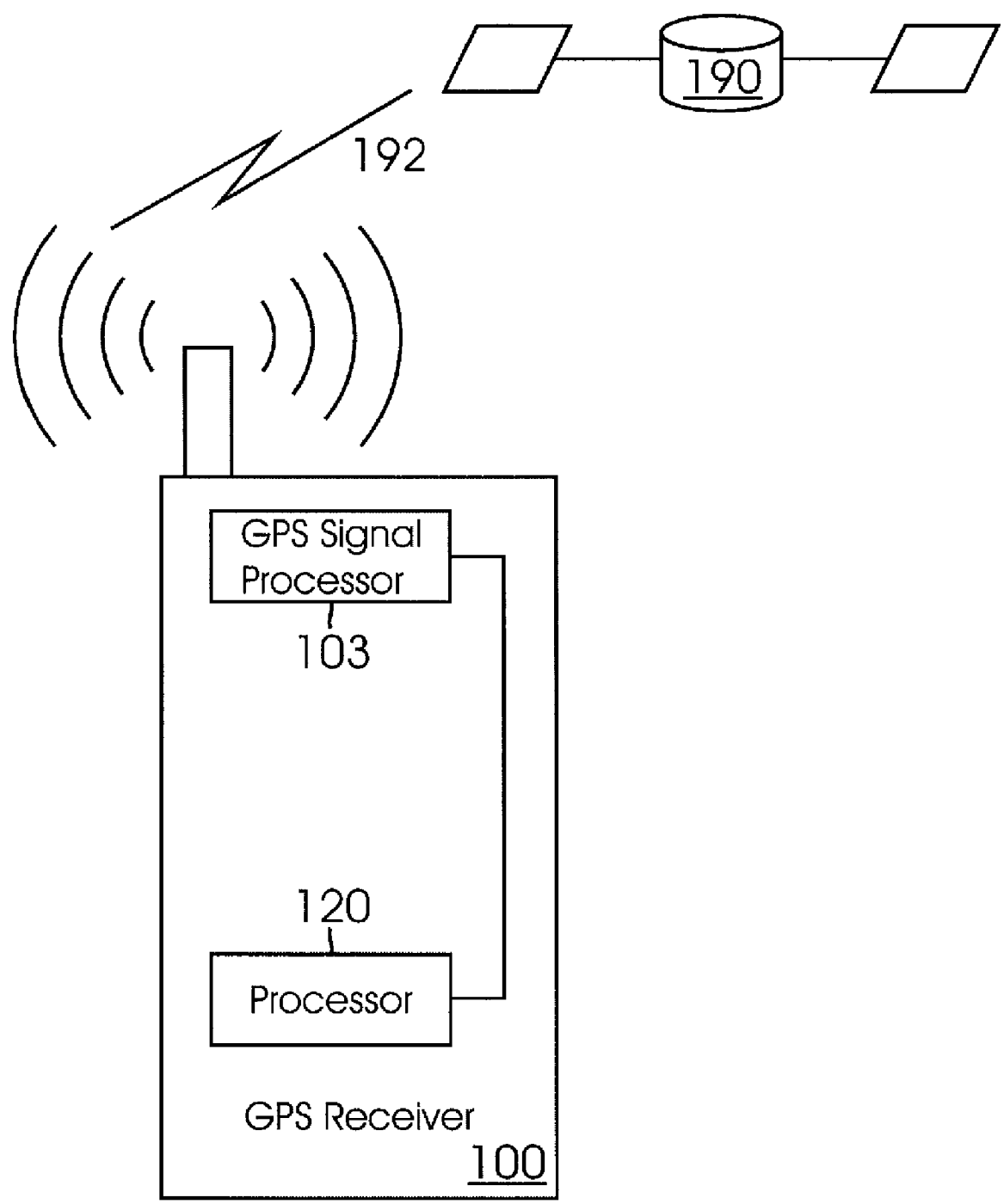
FIG. 1 is a block diagram of a GPS system in accordance with an embodiment of the invention.

Reference will now be made in detail to one or more embodiments of the invention. While the invention will be described with respect to these embodiments, it should be understood that the invention is not limited to any particular embodiment. On the contrary, the invention includes alternatives, modifications, and equivalents as may come within the spirit and scope of the appended claims. Furthermore, in the following description, numerous specific details are set forth to provide a thorough understanding of the invention. The invention may be practiced without some or all of these specific details. In other instances, well-known structures and principles of operation have not been described in detail to avoid obscuring the invention.

Devices and methods are described for enhanced time-to-first-fix (TTFF) for satellite-based navigation receivers such as GPS receivers. This enhanced TTFF results from an exploitation of the following features in GPS protocol. As discussed previously, a GPS satellite continuously transmits a series of known pseudorandom codes. A GPS receiver correlates the known codes with the received codes as part of a pseudorange measurement. This correlation gives the time of reception. However, a pseudorange measurement cannot be performed unless the GPS receiver knows the time of transmission for the received codes. In general, the time of transmission is calculated with respect to the detection of the preamble for the telemetry (TLM) word that starts each sub-frame. Each sub-frame begins with a telemetry (TLM) word followed by a handover word (HOW). The HOW includes the time of week (TOW) that allows a GPS receiver to calculate the transmitted time for a given code. The transmission time for this preamble is given in the time-of-week (TOW) message contained in the handover word (HOW) that follows the TLM word.

Each sub-frame contains an ID number in the HOW. The ID numbers are consecutive and periodic such that the initial sub-frame at the start of a week (TOW equaling zero) has a sub-frame ID of one, the subsequent sub-frame has a sub-frame ID of two, and so on. The sixth sub-frame following the initial sub-frame has a sub-frame ID of one, the seventh sub-frame has a sub-frame ID of two, and so on. It may thus be seen that the sub-frame ID follows the repeating pattern of 1, 2, 3, 4, 5, 1, 2, 3, 4, 5, 1, . . .

This repeating pattern is tied, however, to the TOW because it is initialized to 1 when the TOW is zero. The TOW increments by six seconds as each consecutive sub-frame is transmitted by a satellite. It may thus be seen that the sub-frame ID is related to the TOW by the following relationship: Sub-frame ID=(1+(TOW/6)%5), where %5 represents the modulo-5 operation, which represents the integer remainder when the integer ratio (TOW/6) is divided by the integer five.

This relationship may be exploited as follows. A GPS receiver may follow the detection of the preamble in the TLM word by using the TOW and sub-frame ID obtained from the subsequent handover word. If the sub-frame ID equals 1+(TOW/6)%5, then it may be assumed that the preamble has been properly detected. Because the sub-frame ID is represented in the satellite transmissions as a binary three-bit number, the probability that a given sub-frame ID matches the value of 1+(TOW/6%5) through error equals $\frac{1}{2}^3$. In turn, the probability that the preamble was falsely detected is $\frac{1}{2}^8$, assuming that the probability of transmission of binary ones and zeroes is equal and independent on a bit-to-bit basis. Thus, a time-to-first-fix (TTFF) may be achieved with increased confidence in just 1.2 seconds (the time necessary to receive the TLM word and HOW). Although the possibility of error is quite small, it may be the case that the TTFF is false such that the preamble was not detected properly. The GPS receiver may easily guard against such an unlikely occurrence by observing whether another preamble is received six seconds after the initial preamble reception.

An exemplary GPS device or receiver 100 configured to practice this speedy TTFF is illustrated in FIG. 1. Receiver 100 includes a GPS signal processor 103 that receives GPS-encoded signals 192 from satellites 190 (for illustration clarity, only a single satellite is shown). The GPS signal processor decodes the GPS-encoded signals from the satellites to, for example, decode the preamble in the TLM word and to decode the TOW and sub-frame ID in the subsequent HOW. A processor 120 compares the sub-frame ID and the TOW by, for example, determining whether the sub-frame ID equals the quantity 1+(TOW/6)%5. If so, the GPS receiver may proceed to use the TOW in determining a time of transmission. For example, suppose the TOW is 1344 seconds and a GPS receiver by its autocorrelation and discrimination function for a given code sequence obtains a value of 0.56. Each bit corresponds to the transmission of 20 C/A codes. By bit alignment, the GPS receiver can determine which of the 20 codes transmitted within each bit corresponds to the given code sequence giving the autocorrelation value of 0.56. Similarly, from the detection of the preamble, the GPS receiver can determine which word and data bit the given code sequence was transmitted in. For example, suppose the given code sequence giving the autocorrelation of 0.56 was received in the second word following the preamble and that it corresponds to the 4$^{th}$ code in the 23$^{rd}$ bit in this second word. Should the TOW equal 1344 seconds it follows that the time of transmission for this code is: 1344+0.6*(2−1)+(23−1)*0.02+(4−1)*0.001+0.56*0.001, which equals 1344.04356 seconds. Because the GPS signal processor knows the time of reception according to its clock, it may now calculate the pseudorange between it and the transmitting satellite. It will be appreciated that the distinction between "GPS signal processor" and "processor" is somewhat arbitrary in that a single integrated circuit may be used to perform both functions. Moreover, the term "processor" is used to refer to a calculation engine capable of performing the sub-frame ID and TOW comparison—such a calculation may be performed in other circuits such as a configured programmable logic device rather than a microprocessor.

Figure 2:
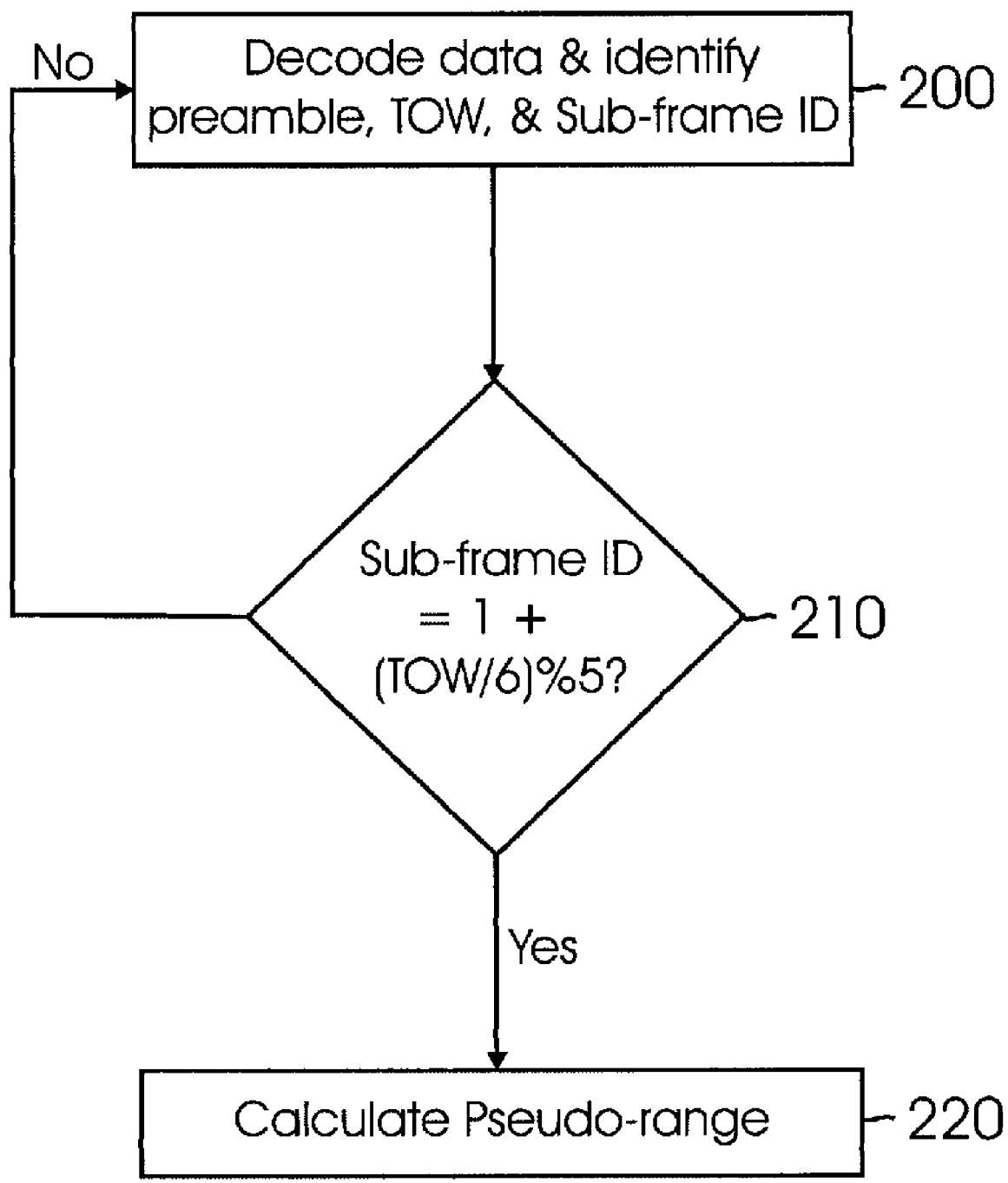
FIG. 2 is a flowchart illustrating a method of calculating current satellite states in accordance with an embodiment of the invention.

An exemplary TTFF process is summarized in FIG. 2. At step 200, a GPS receiver decodes the received data from a GPS satellite to identify the preamble, TOW, and sub-frame ID for a given sub-frame. At step 210, the GPS receiver compares the TOW and sub-frame ID to determine if the sub-frame ID corresponds properly to the TOW. For example, the GPS receiver may determine if the sub-frame ID equals the quantity 1+(TOW/6)%5. If it does, the GPS receiver may calculate pseudo-ranges at step 220. If step 210 determines that the sub-frame ID does not equal the quantity 1+(TOW/6)%5, the detection of the preamble in step 200 is considered an error such that the GPS receiver continues to decode the transmissions from the satellite to locate the preamble by repeating step 200. In this fashion, the GPS receiver may achieve a TTFF in as little as 1.2 seconds as compared to the conventional 6 second process.

Although the invention has been described with respect to particular embodiments, this description is only an example of the invention's application and should not be taken as a limitation. Consequently, the scope of the invention is set forth in the following claims.

What is claimed is:

1. A method, comprising:
 receiving GPS-encoded signals from a satellite, wherein the GPS-encoded signals are organized into sub-frames;
 for a given received sub-frame, identifying a potential preamble and a potential time of week (TOW) and a potential sub-frame identification (ID);
 comparing the potential sub-frame ID to the potential TOW to confirm that the potential preamble is an actual preamble to thereby confirm that the potential TOW is an actual TOW; and
 using the actual TOW to determine a time of transmission for the given received sub-frame.

2. The method of claim 1, further comprising:
 using the time of transmission to determine pseudoranges.

3. The method of claim 1, wherein the comparing act comprises performing a modulus operation on the TOW.

4. The method of claim 3, wherein the modulus operation is a modulo-5 operation.

5. The method of claim 1, wherein the comparing act comprises:
 dividing the TOW by an integer to form a ratio; and
 performing a modulo operation on the ratio to provide a remainder;
 incrementing the remainder to form an incremented remainder; and
 comparing the incremented remainder to the sub-frame ID.

6. The method of claim 5, wherein incrementing the remainder comprises incrementing the remainder by one.

7. The method of claim 5, wherein comparing the incremented remainder to the sub-frame ID comprises determining whether the incremented remainder and the sub-frame ID are equal.

8. The method of claim 6, further comprising:
 if the sub-frame ID equals the incremented remainder, using the TOW to establish a time of transmission for the given received sub-frame.

9. The method of claim 8, further comprising:
 using the time of transmission in determining a pseudorange.

10. A receiver, comprising:
 a GPS signal processor adapted to decode GPS-encoded signals to provide decoded signals; and
 a processor adapted to identify sub-frames in the decoded signals, the processor being further adapted to identify, for a given identified, sub-frame, a potential preamble, a potential time-of-week (TOW) message, and a potential sub-frame identification (ID), the processor being further adapted to compare the potential sub-frame ID to the potential TOW to confirm that the potential preamble is an actual preamble to thereby determine that the potential TOW is an actual TOW, the processor being further adapted to use the actual TOW so as to determine a time of transmission for the given identified sub-frame.

11. The receiver of claim 10, wherein the processor is configured to compare the sub-frame ID to the TOW by performing a modulus operation on the TOW.

12. The receiver of claim 11, wherein the modulus operation is a modulo-5 operation.

13. The receiver of claim 10, wherein the processor is configured to perform the comparison by:
 dividing the TOW by an integer to form a ratio; and
 performing a modulo operation on the ratio to provide a remainder;
 incrementing the remainder to form an incremented remainder; and
 comparing the incremented remainder to the sub-frame ID.

14. The receiver of claim 13, wherein the processor is configured to compare the incremented remainder to the sub-frame ID by determining whether the incremented remainder and the sub-frame ID are equal.

15. The receiver of claim 14, wherein the processor is further configured to establish the time of transmission for the given received sub-frame if the sub-frame ID equals the incremented remainder by using the TOW.

16. The receiver of claim 15, wherein the processor is further configured to use the time of transmission to determine a pseudorange.

17. An apparatus, comprising:
 means for decoding GPS-encoded signals so as to retrieve a potential preamble, a potential time-of-week (TOW) message, and a potential sub-frame ID for a given transmitted sub-frame from a GPS satellite; and
 means for comparing the potential sub-frame ID to the potential TOW to confirm that the potential preamble is an actual preamble to thereby determine that the potential TOW is an actual TOW and for using the actual TOW so as to determine a time of transmission for the given transmitted sub-frame.

18. The apparatus of claim 17, wherein the means for comparing the sub-frame ID to the TOW is configured to perform the comparison by:
 dividing the TOW by an integer to form a ratio; and
 performing a modulo operation on the ratio to provide a remainder;
 incrementing the remainder to form an incremented remainder; and
 comparing the incremented remainder to the sub-frame ID.

19. The apparatus of claim 18, wherein the means for comparing the sub-frame ID to the TOW is configured to compare the incremented remainder to the sub-frame ID by determining whether the incremented remainder and the sub-frame ID are equal.

* * * * *